(12) United States Patent
Lemkin

(10) Patent No.: US 6,786,177 B1
(45) Date of Patent: Sep. 7, 2004

(54) ANIMAL FEEDER WITH STORAGE WELLS

(76) Inventor: Jack Lemkin, 579 Glenmont Ave., Columbus, OH (US) 43214

( * ) Notice: Subject to any disclaimer, the term of this patent is extended or adjusted under 35 U.S.C. 154(b) by 0 days.

(21) Appl. No.: 10/419,200

(22) Filed: Apr. 21, 2003

(51) Int. Cl.[7] .................................................. A01K 5/01
(52) U.S. Cl. ...................................... 119/51.01; 119/61
(58) Field of Search ................................ 119/61, 51.01, 119/51.05, 72, 74; 220/8, 528, 529; D30/121, 130

(56) References Cited

U.S. PATENT DOCUMENTS

| | | | |
|---|---|---|---|
| 2,213,837 A | | 9/1940 | Gill |
| 2,555,396 A | | 6/1951 | Cosner |
| 2,845,896 A | | 8/1958 | Copeland |
| 3,349,941 A | | 10/1967 | Wanderer |
| 4,699,089 A | | 10/1987 | Teschke |
| 4,802,302 A | | 2/1989 | Alnafissa |
| 4,976,223 A | | 12/1990 | Pierce |
| 5,501,176 A | * | 3/1996 | Tully ............................ 119/61 |
| 5,509,376 A | * | 4/1996 | Tsengas ...................... 119/51.5 |
| D393,107 S | * | 3/1998 | Tsengas ...................... D30/121 |
| 5,730,081 A | * | 3/1998 | Tsengas ...................... 119/51.5 |
| 6,145,474 A | | 11/2000 | Lemkin |
| 6,205,950 B1 | | 3/2001 | Thompson, Jr. |
| 6,209,487 B1 | | 4/2001 | Quinlan et al. |

* cited by examiner

Primary Examiner—Charles T. Jordan
Assistant Examiner—Judith A. Nelson
(74) Attorney, Agent, or Firm—Hoffman, Wasson & Gitler P.C.

(57) ABSTRACT

An animal feeder, including a sturdy, molded plastic base, and a horizontally extending deck for receiving two or more water and food bowls, and legs or sidewalls secured to the deck for retaining same in an elevated position. Recesses are defined in the deck to receive the bowls. Wells are formed in the interior of the base, and communicate with the recesses. In the preferred embodiment, the wells store limited quantities of dry food, or treats, below each recess so that the food may be accessed by removing the bowl. In an alternative embodiment, the wells are formed with ledges or lips that engage the covers of food containers for "wet" food. Access to the wells, or to the interior of the base of a two component dog feeder, may be gained by removing the cover.

5 Claims, 7 Drawing Sheets

ANIMAL FEEDER WITH STORAGE WELLS

BACKGROUND OF THE INVENTION

1. Field of the Invention

The instant invention relates generally to animal feeders, and more particularly to animal feeders with storage capability defined within the interior of the base of such animal feeders.

2. Description of the Related Art

Animal feeders that provide food for pets, particularly dogs, at an elevated position, to improve the health of the animal, are known. A representative feeder is disclosed in U.S. Pat. No. 6,209,487, granted Apr. 3, 2001, to R. L. Quinlan et al, and assigned to Pet Zone Products of Cleveland, Ohio.

U.S. Pat. No. 6,209,487 shows an animal feeder 10 that provides food, at an elevated position. The feeder includes a molded plastic support structure 20 having removable feeder vessels 40. The base of the top surface is generally oblong in shape, as shown in FIG. 2, with flared side surfaces 26 to provide support. The top surface 22 has openings 24 for receiving feeding vessels 40. A preferred feeding vessel has a raised back surface 46 to act as a back splash. The raised back splash may also include a notch 44 for easily removing the feeding vessel from the support structure for, filling and cleaning the vessel. The animal feeder described in U.S. Pat. No. 6,209,487 is sold in Pet Zone stores under the trademark, HEALTHY CARE™ dog feeder, Model 55010. Unfortunately, no provision is made for the storage of food for the animal, in the feeder.

Another animal feeder, formed of several blow molded plastic components, is disclosed in U.S. Pat. No. 5,509,376, granted Apr. 23, 1996 to Steven Tsengas. U.S. Pat. No. 5,509,376 discloses an animal feeder that provides food and water, at an elevated position, above a support surface, and is thus particularly suited for feeding large dogs. The feeder comprises a feeder tray 12 and a plurality of hollow legs 14 attached to the feeder tray. Each hollow leg is capable of holding ballast material, such as sand or water, for lowering the center of gravity of the feeder from the preferred feeding location. No provision, however, is made for the storage of animal food within the feeder.

Another, more versatile molded plastic animal feeder is disclosed in U.S. Pat. No. 6,145,474, granted Nov. 14, 2000, to Jack Lemkin (the applicant in the instant application). U.S. Pat. No. 6,145,474 discloses an animal feeder 10 consisting of two molded components, namely a top 12 and a base 14. The top comprises an upper surface 16 with a depending sidewall 18, while the base comprises a bottom wall 20 with an upstanding side wall 22. Ribs 42, 44, 46, 58, 50 and 52 are spaced about the interior surface of the depending sidewall of the top, and depressions, or grooves, 54, 56, 58, 60, 62 and 64 are formed in the outer surface of the sidewall of the base, as shown in FIG. 3. The top is slightly larger than the base, and can fit thereover, as is shown in FIGS. 1 and 4. The top can be rotated 180° relative to the base, between two operative positions, to define an elevated feeding position, and a lowered feeding position.

A large storage area is formed in the interior of base 14, as shown in FIG. 2, and as described in column 3, lines 29–32. Access to this storage area is possible only by removing the top, and lifting same off the base; also, the storage area is suitable only for the storage of dry food.

Another animal feeder, with food storage capacity, is disclosed in U.S. Pat. No. 4,699,089, granted Oct. 13, 1987, to Gloria M. Teschke. U.S. Pat. No. 4,699,089 discloses a pet feeder, particularly for pet dogs, including a storage container 20 for the storage of food and accessories, and a removable feeding table 30 which prevents access to the storage container when the pet is feeding. The feeding table is removable from the storage container by a vertically upward displacement, as shown in FIG. 2. The feeding table is provided with a plurality of removable food and water bowls 40, and with a splashboard 32, 35, 39 along the rear and sides of the feeding table. The container is formed of wood, as noted in column 2, lines 19–25, and the same holds true for the feeding table, as noted in column 2, lines 26–28. The cost of manufacturing and assembling such feeder limits its commercial acceptance.

The known feeders discussed above, have suffered from one, or more, of the following shortcomings. In some instances, no provision is made for the storage of food, for the animal, within the confines of the feeder. In other instances, the feeder includes a large central storage area in the interior of the feeder, but gaining access to same requires removal of a top cover. In all instances, a food storage area, if available, is only suitable for storing dry food, and is not situated in proximity to the food bowls or dishes for the animal.

SUMMARY OF THE INVENTION

In view of the shortcomings associated with known animal feeders, the present invention provides a molded plastic animal feeder, of simple design, that can be economically produced, yet provide considerable capacity for internal storage of animal food. More specifically, the present invention is directed to the provision of wells, defined within the confines of the feeder, to receive, and store, animal food, usually dog food. Two embodiments of the wells are disclosed, and the storage of wet and dry dog food, in containers, is envisioned.

The wells are defined in proximity to, and in communication with, the recesses provided in the deck of known feeders to receive water and feed bowls. Access is gained to the wells by the simple expedient of lifting up, or removing, the food and water bowls.

The wells are formed within the confines of the molded plastic base, by eliminating the bottom wall of each recess that receives a food and water bowl. The wells may be introduced into known animal feeders, particularly those formed of molded plastic, by simple alterations of existing molds.

The wells are located, and shaped, to be compatible with the base of the feeder, and located strategically to enhance the stability of the feeder. The wells are easy to access, and possess rounded corners to facilitate cleaning.

Other objects and advantages realized by the instant invention will become readily apparent to the skilled artisan, when the specification and the appended drawings are construed in harmony.

DETAILED DESCRIPTION OF THE PREFERRED EMBODIMENT

Figure 1:
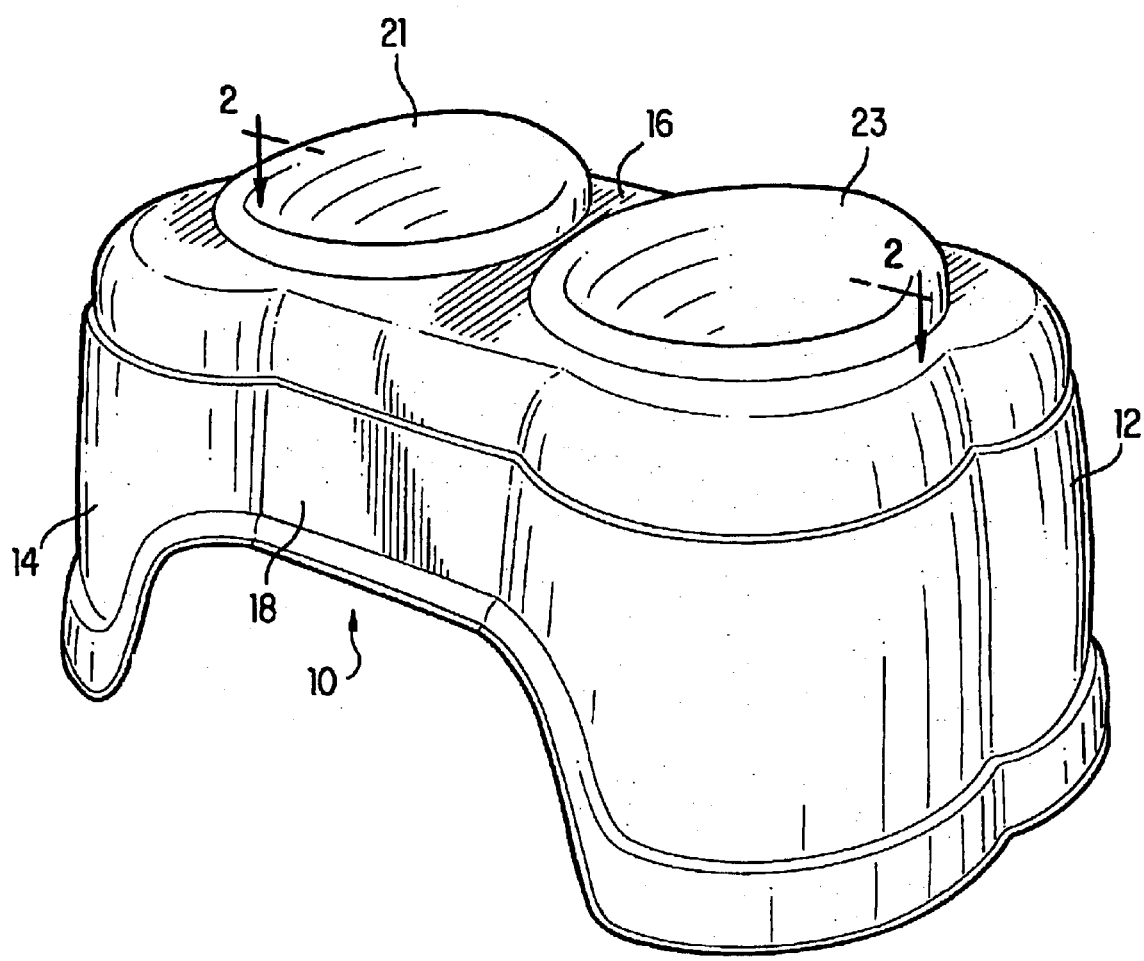
FIG. 1 is a perspective view of a known molded plastic animal feeder, and is designated as PRIOR ART.
Figure 2:
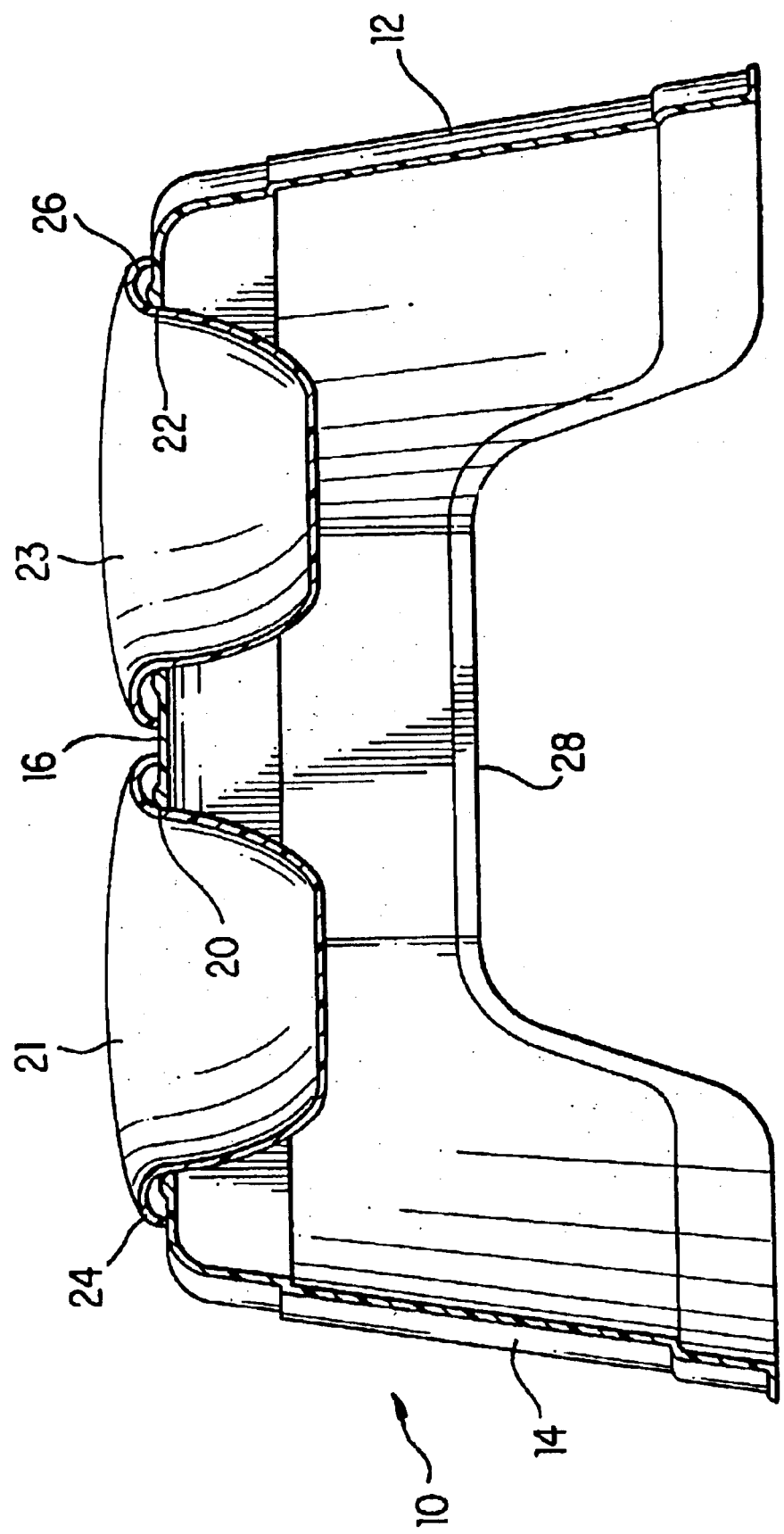
FIG. 2 is a vertical cross-sectional view of the animal feeder of FIG. 1, such view being taken along lines 2—2 in FIG. 1, and in the direction indicated.

Referring now to the drawings, FIGS. 1 and 2 show the known, molded plastic dog feeder disclosed in U.S. Pat. No. 6,209,487, granted to Quinlan et al on Apr. 3, 2001, and assigned to Pet Zone Products of Cleveland, Ohio. The dog feeder is indicated generally by reference numeral 10. Flared side walls 12 and 14 support deck 16, and panel 18 rigidifies the base of the feeder. Recesses 20 and 22 are formed within deck 16 to receive metal, or plastic, food and water dishes 21, 23. Flared sidewall 24 is formed at the upper end of dish 21, and a similarly flared sidewall 26 is formed at the upper end of dish 23. A cut-out 28 is formed below panel 18 to accommodate the paws and knees of the animal approaching the feeder to eat or drink.

Wells 30, 32 are formed within the confines of animal feeder 10, in conformance with applicant's invention. Wells 30, 32 are substantially cylindrical, or frusto-conical, in shape, and are molded as an integral part of feeder 10 as enhanced by applicant's invention. Bottom wall 34 seals the bottom of well 30, while bottom wall 36 seals the bottom of well 32. By removing bowl 21 from recess 20 in deck 16, the pet owner gains access to the dog food 38 stored therein, and may remove food, as is necessary, to place into the bowl 21. Similarly, by removing bowl 23 from opening 22, the pet owner gains access to well 32 and dog food 40 stored therein. Wells 30, 32 conveniently contain a large volume of dog food, and keep the food dry, and extend the shelf life of the stored food. The wells also provide a visual indication of the amount of dog good food retained within the animal feeder 10.

Figure 3:
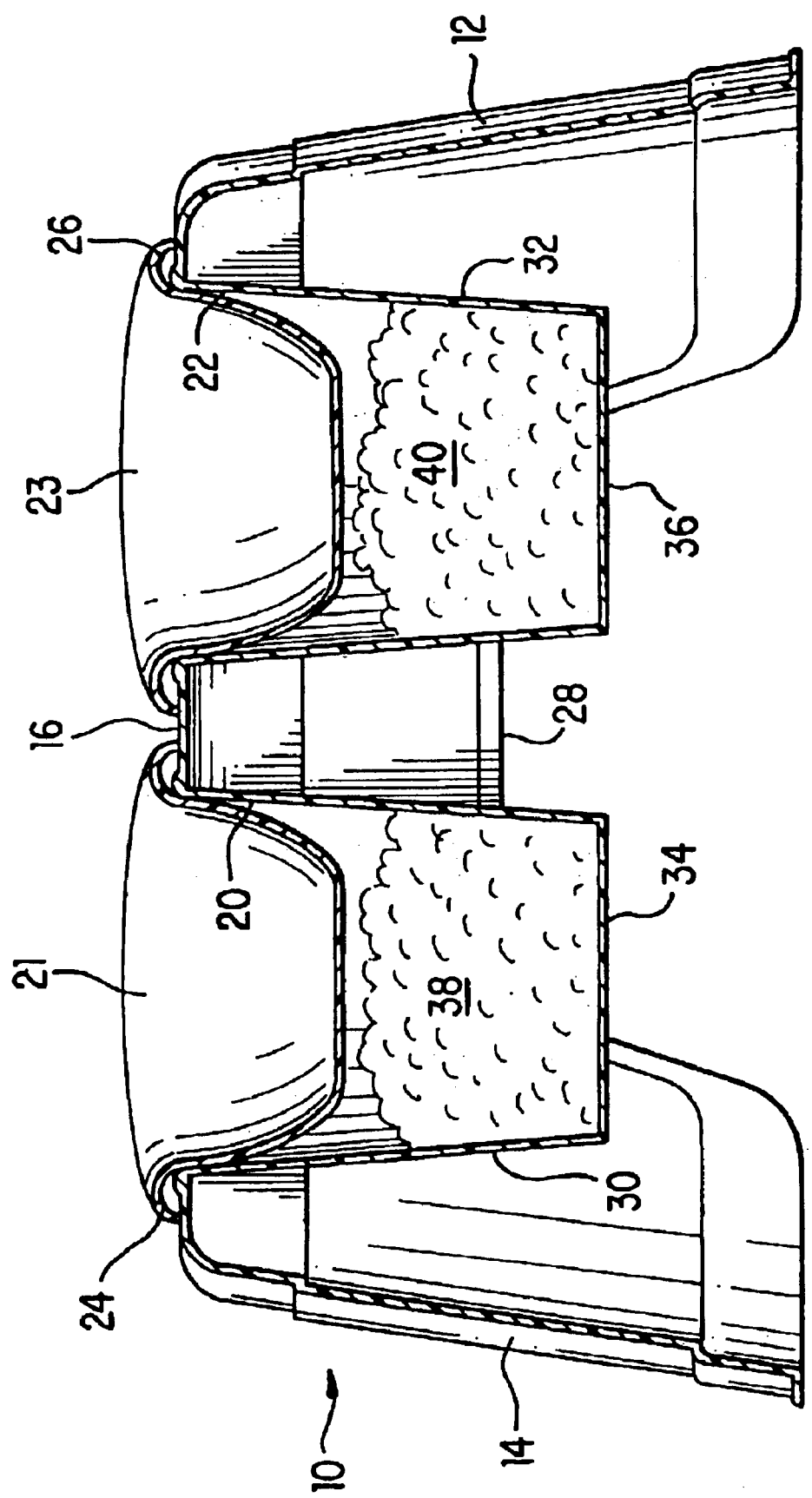
FIG. 3 is a vertical cross-sectional view of the animal feeder of FIGS. 1 and 2, but showing a preferred embodiment of the wells for food storage constructed in accordance with the principles of the instant invention.
Figure 4:
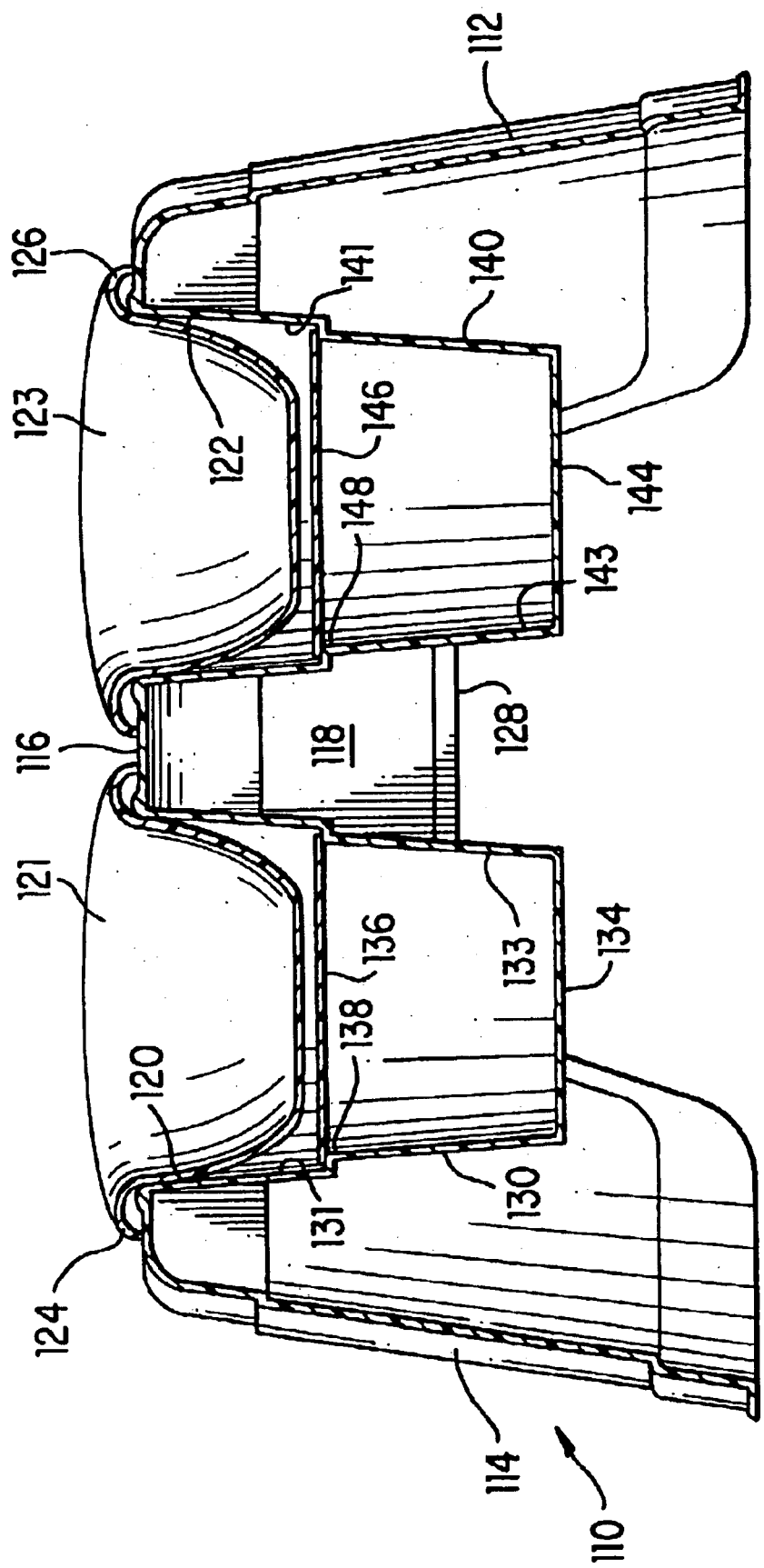
FIG. 4 is a vertical cross-sectional view of the animal feeder of FIGS. 1 and 2, but showing a first alternative embodiment of applicant's wells for food storage.

FIG. 4 shows an alternative embodiment of the wells defined within animal feeder 10. The components that are common to the preferred embodiment of FIG. 3 are identified as animal feeder 110, side walls 112, 114, support deck 116, and panel 118. Recesses 120 and 122 are formed within deck 116 to receive metal, or plastic, food and water dishes 121, 123. Flared sidewall 124 is formed at the upper end of dish 121, and a similarly flared sidewall is formed at the upper end of dish 123. A cut-out 128 is formed below panel 118.

Well 130 comprises an upper chamber 131 and a lower chamber 133. A bottom wall 134 seals off the lower chamber, and a removable cover 136 rests on a ledge 138, at the intersection of the upper and lower chambers. Cover 136 extends parallel to bottom wall 134. The upper and lower chambers taper inwardly.

Well 140 comprises an upper chamber 141 and a lower chamber 143. A bottom wall 144 seals off the lower chamber, and a removable cover 146 rests on a ledge 148, at the intersection of the upper and lower chambers. The upper and lower chambers taper inwardly. While the wells 30, 32 are intended to hold dry dog food, wells 130 and 140 may retain either dry dog food or "wet" dog food. The dry dog food may be removed by the hand of the pet owner, while the wet dog food may be scooped out using a manual implement. Alternatively, the wet dog food may be stored, in its own can, in the lower chamber, with the cover resting on the ledge, or may be placed in a plastic tub or storage container.

The wells 30, 32 formed in the preferred embodiment of animal feeder 10 shown in FIG. 3, and the wells 130 and 140 formed in the alternative embodiment of animal feeder 110 shown in FIG. 4, are located within the base, or stand, of a unitary molded plastic feeder. However, the second alternative embodiment of animal feeder 210, shown generally in FIGS. 5 and 6, and with particularity in FIG. 7, situates the wells for food storage in a different, albeit convenient, location.

Figure 5:
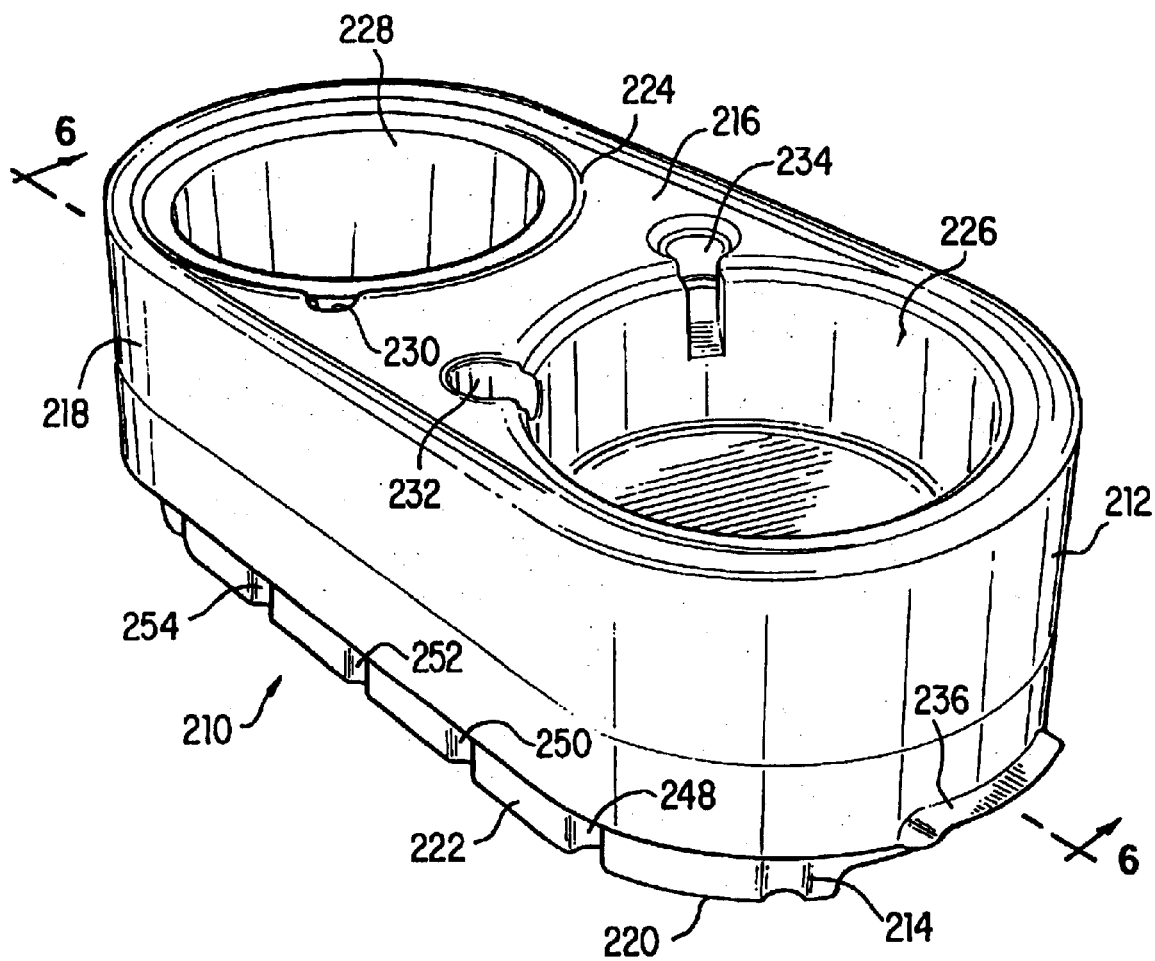
FIG. 5 is a perspective view of another known animal feeder, formed of a base and a telescoping top, and is also designated as PRIOR ART.
Figure 6:
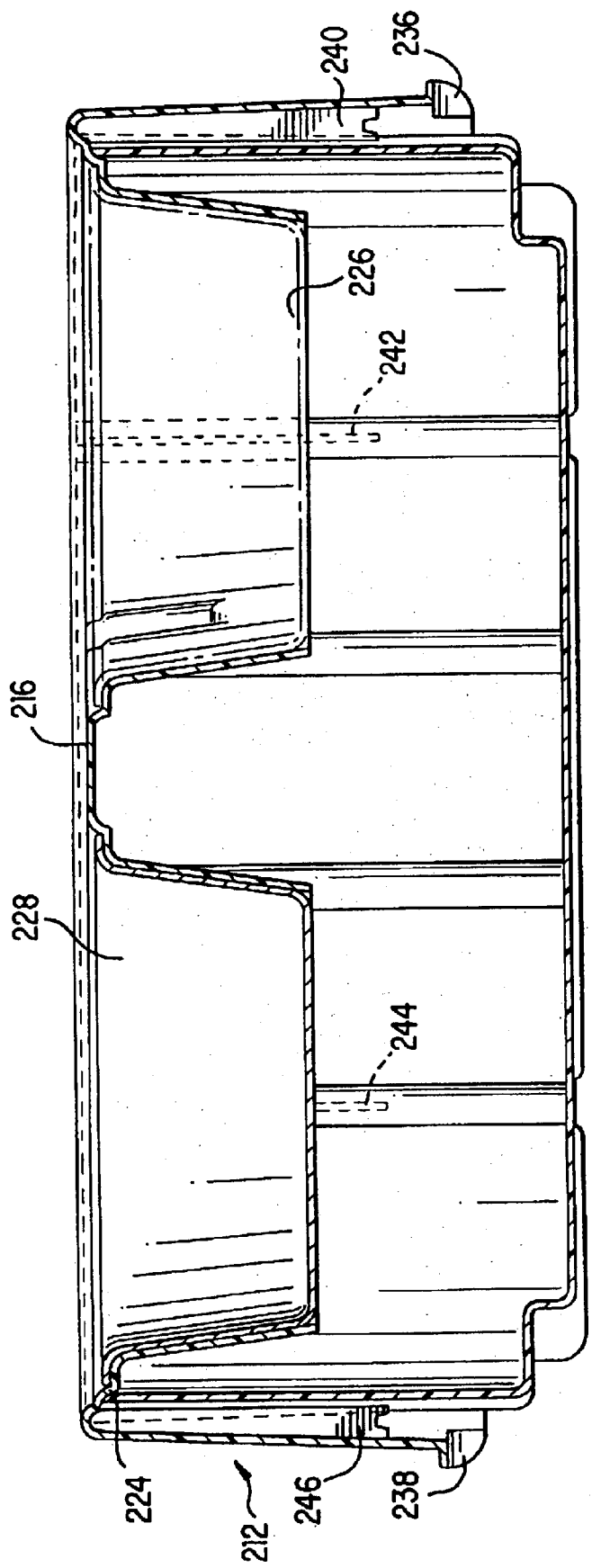
FIG. 6 is a vertical, cross-sectional view of the animal feeder of FIG. 5, such view taken along line 6—6 in FIG. 5, and in the direction indicated.

Animal feeder 210, shown in FIGS. 5 and 6, is a known molded plastic animal feeder disclosed in U.S. Pat. No. 6,145,474, granted Nov. 14, 2000, to Jack Lemkin. Animal feeder 210 comprises a top 212 and a base 214; the top is slightly larger than the base and is shaped to fit thereover, in a telescoping manner. Top 212 comprises an upper surface, or deck 216, and a depending sidewall 218.

Base 214 comprises a bottom wall 220 and an upstanding sidewall 222; the base opens upwardly (not shown). Recesses 224, 226 are formed in the upper surface 216 of top 212. A removable bowl 228, formed of metal or plastic, is placed in recess 224. Depression 230, 232 allow the person feeding the animal to readily remove the bowl for cleaning, and threaded depression 234 is provided adjacent to recess 226 for attaching a bottle (not shown). A bowl, for water or food, would usually occupy recess 224. Hand grips 236, 238 are located at opposite ends of top 212.

FIG. 5 shows that top 212 fits over base 214, in a telescoping fashion, so that the underside of top 212 rests on the upper edge (not shown) of side wall 222 of base 214. The feeder is thereby reduced in height, and is suitable for use by small to medium sized dogs, or other animals.

Ribs 240, 242, 244 and 246 are formed at regular intervals about the interior surface of top 212, as shown in FIG. 5. The ribs strengthen top 212. Inwardly extending grooves 248, 250, 252, 254 cooperate with the inwardly extending ribs in top 212. When the pet owner wishes to convert the animal feeder to an elevated position, he grasps grips 236, 238, removes the top 212 from the base, and rotates the top 180°. The top is then positioned on the base, so that ribs 240, 242, 244, 246, etc. rest upon the upper edge of the sidewall 222 of base 214. The deck 216 is thus positioned at a greater elevation above the ground, for example 12–14 inches, and establishes an elevated feeding position for large dogs.

The interior of base 214 is hollow, and dog food, or ballast, such as sand, may be stored therein. The top 212, as disclosed in U.S. Pat. No. 6,145,474, must be removed to gain access to the food stored in bottom 220.

Figure 7:
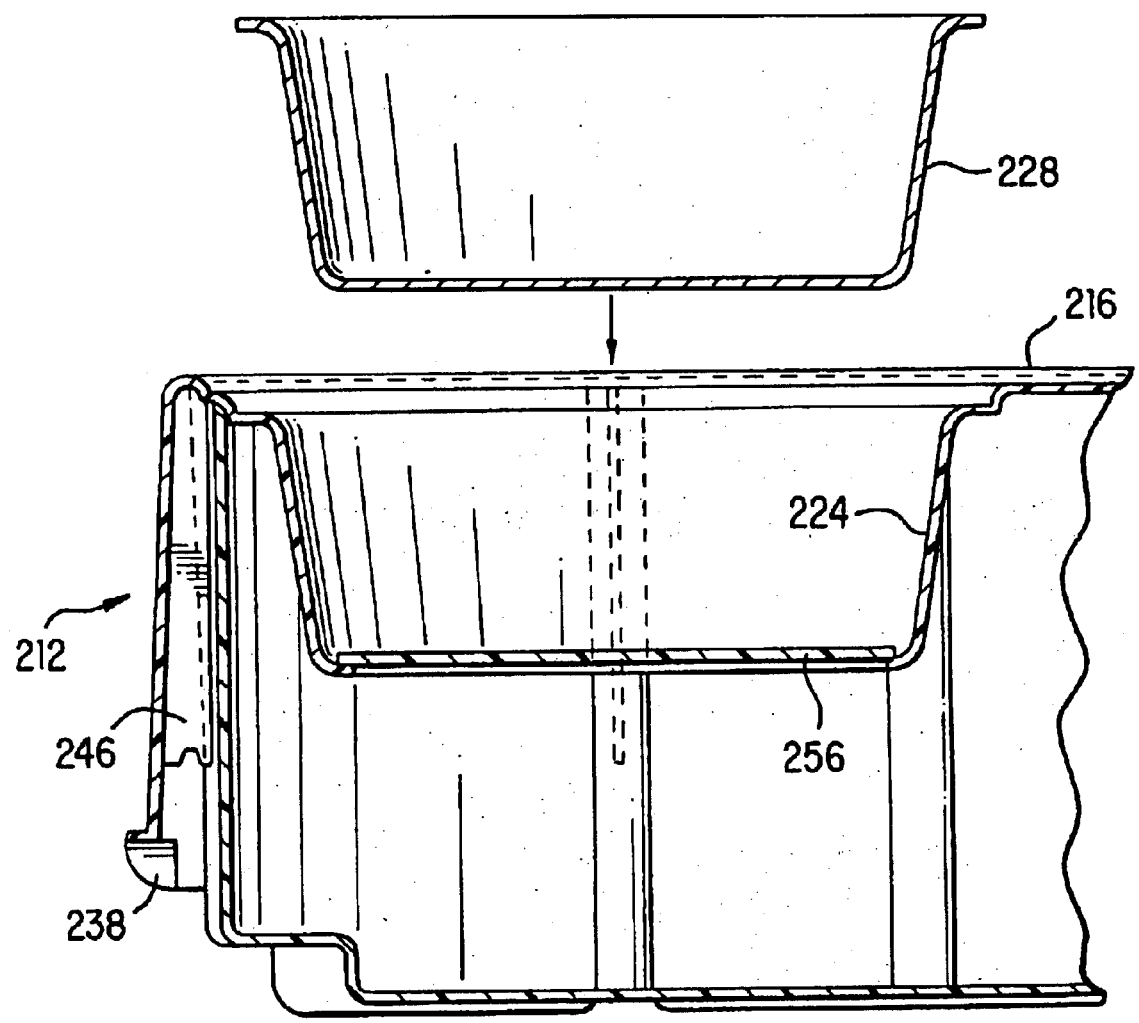
FIG. 7 is a vertical cross-sectional view of a fragment of the top of the animal feeder of FIGS. 5 and 6, but showing a second alternative embodiment of applicant's wells for food storage.

However, as shown in FIG. 7, applicant has addressed such shortcoming in a unique manner. The bottom wall of recess 224 is removed, and an optional plastic cover 256 fills the opening and blocks access to the interior of the base. When the pet owner wishes to gain access to the interior of the base, and the dog food, stored therein, he simply retrieves bowl 228 from recess 224, and removes cover 256. The interior of base 214, may contain a different type of food than that normally deposited in bowl 224; for example, dog treats as contrasted with dog food or water.

The foregoing description of the preferred embodiment of FIGS. 1–4 and the alternative embodiment of FIGS. 5–7 should be construed in an illustrative manner, for other modifications of the wells for storing pet food, within the confines of an animal feeder, will occur to the skilled artisan. For example, in the alternative embodiment of FIGS. 5, 7, cover 256 may be omitted, and one or more wells may be formed in the interior of the base of the two piece dog feeder of FIGS. 5–7. While intended primarily for dogs, the feeder assembly, with storage wells, may find application with other animals. Consequently, the appended claims should be liberally construed in a manner consistent with the spirit and scope of the invention, and should not be limited to their literal terms.

I claim:

1. An animal feeder comprising:
   a) a horizontally extending deck,
   b) vertically extending means for retaining said deck in an elevated position parallel to, and spaced from, a supporting surface,
   c) at least one recess formed in said deck,
   d) said recess being sized to receive a feeding bowl therein,
   e) the invention being characterized by:
      1) a well for storing animal food located below said recess,
      2) said well including an open upper end in complete communication with said recess,
      3) said well further including a side wall and a bottom wall for enclosing same, said bottom wall being parallel to, but spaced from, said deck and the supporting surface,
      4) said feeding bowl, when seated in said recess, contacting said deck and extending downwardly into said well to block access to animal food stored therein.

2. An animal feeder as defined in claim 1, wherein said well is further characterized by a cylindrical sidewall.

3. An animal feeder as defined in claim 2, wherein said well is further characterized by a sloping sidewall, so that the area at the open end of the well is greater than the area at the closed bottom of the well.

4. An animal feeder as defined in claim 1, wherein said bottom wall of said well is removable to allow access from said deck, through said recess, and into the interior of said animal feeder.

5. An animal feeder as defined in claim 1 further including a ledge located within the interior of said well and spaced intermediate said top opening and said bottom wall of said well, such ledge being adapted to receive a cover that divides said well into an upper and a lower chamber.

* * * * *